Nov. 4, 1952 T. JAMES, JR 2,616,527
BRAKE SLACK ADJUSTING MECHANISM
Filed Feb. 4, 1947 4 Sheets-Sheet 1

INVENTOR.
Thomas James, Jr.
BY
Attorney.

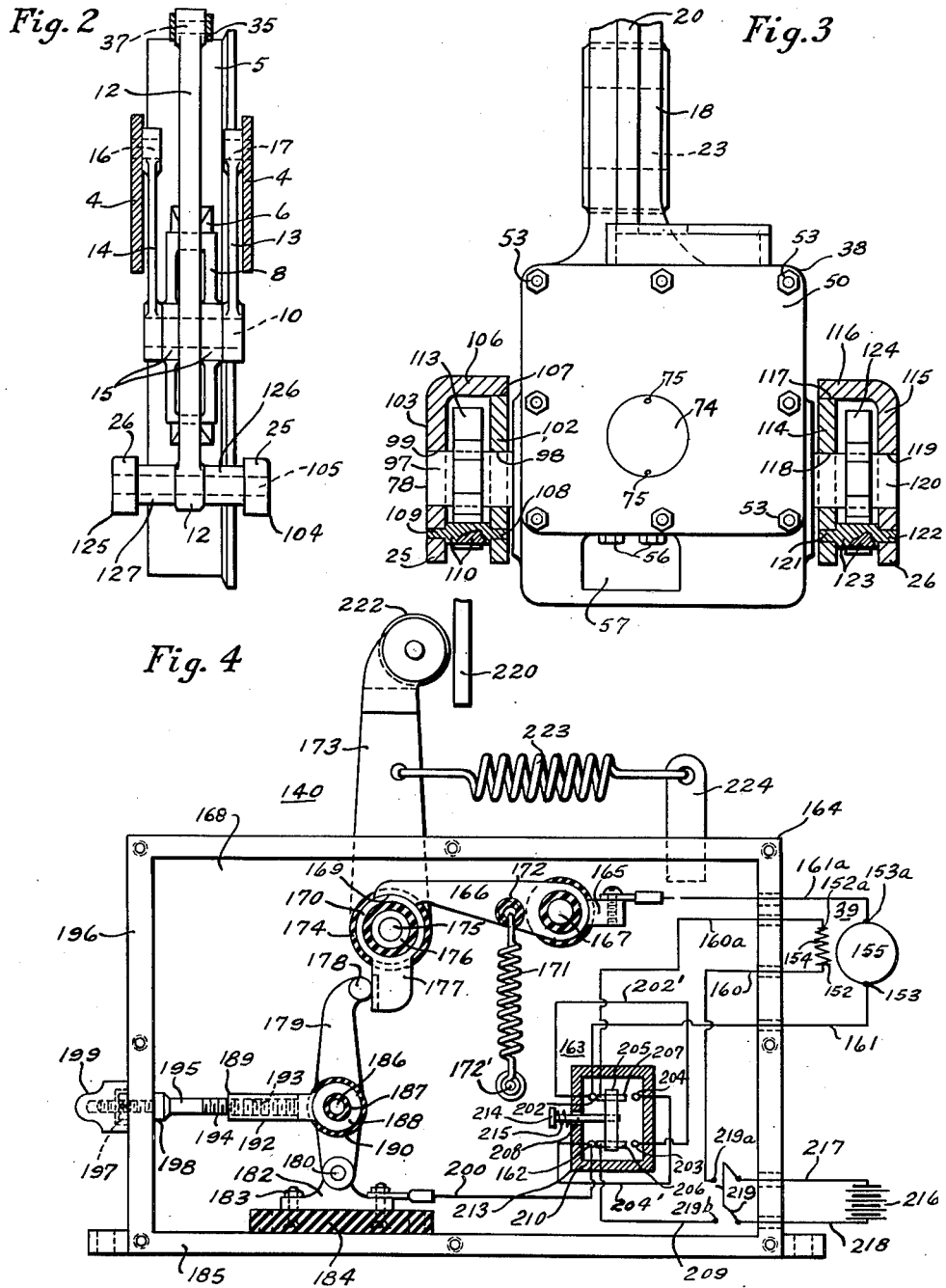

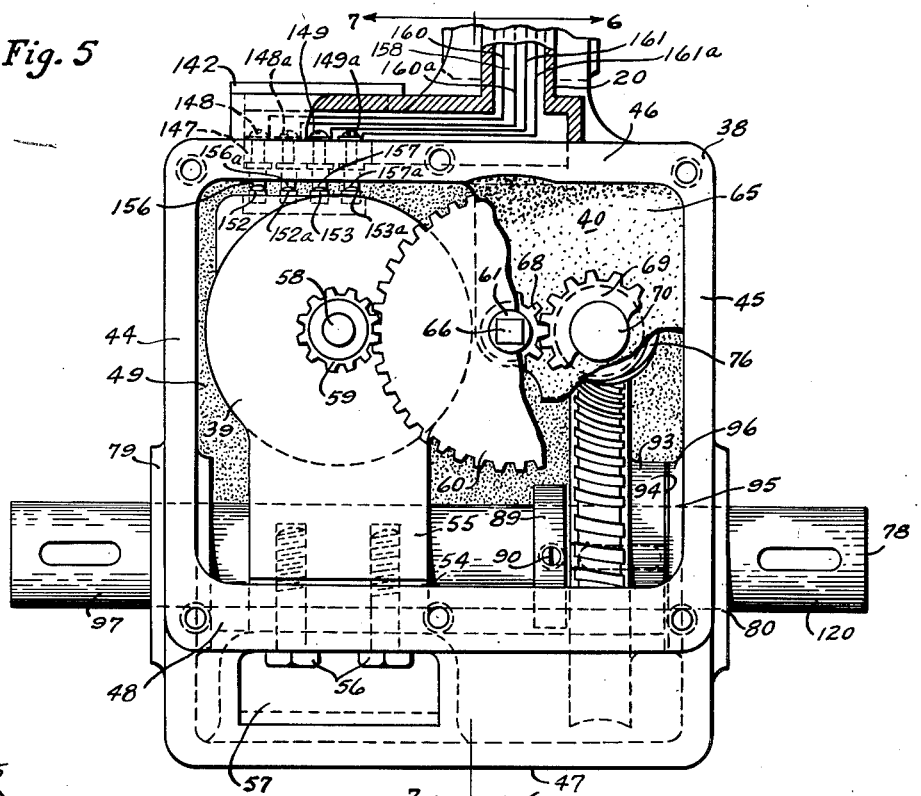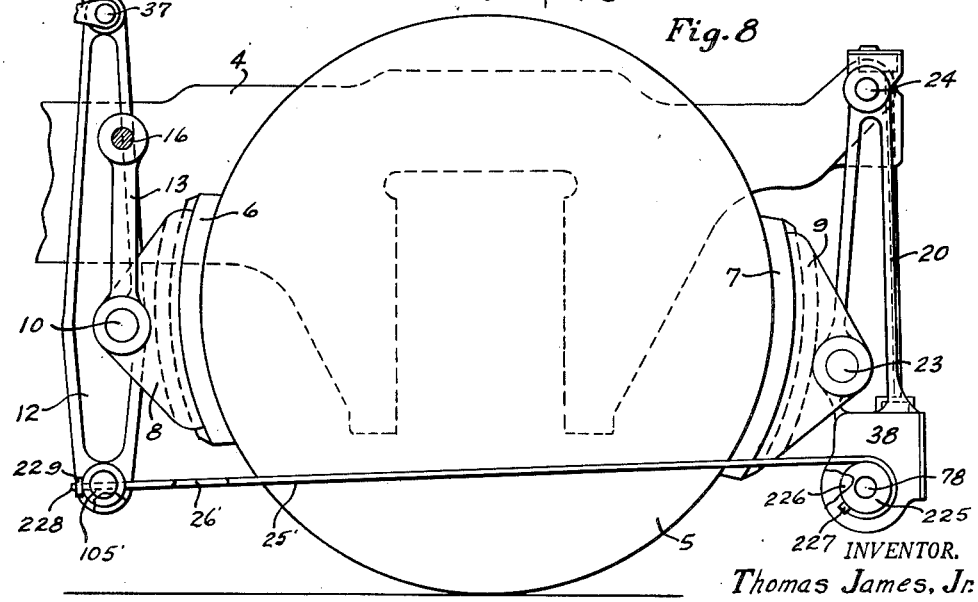

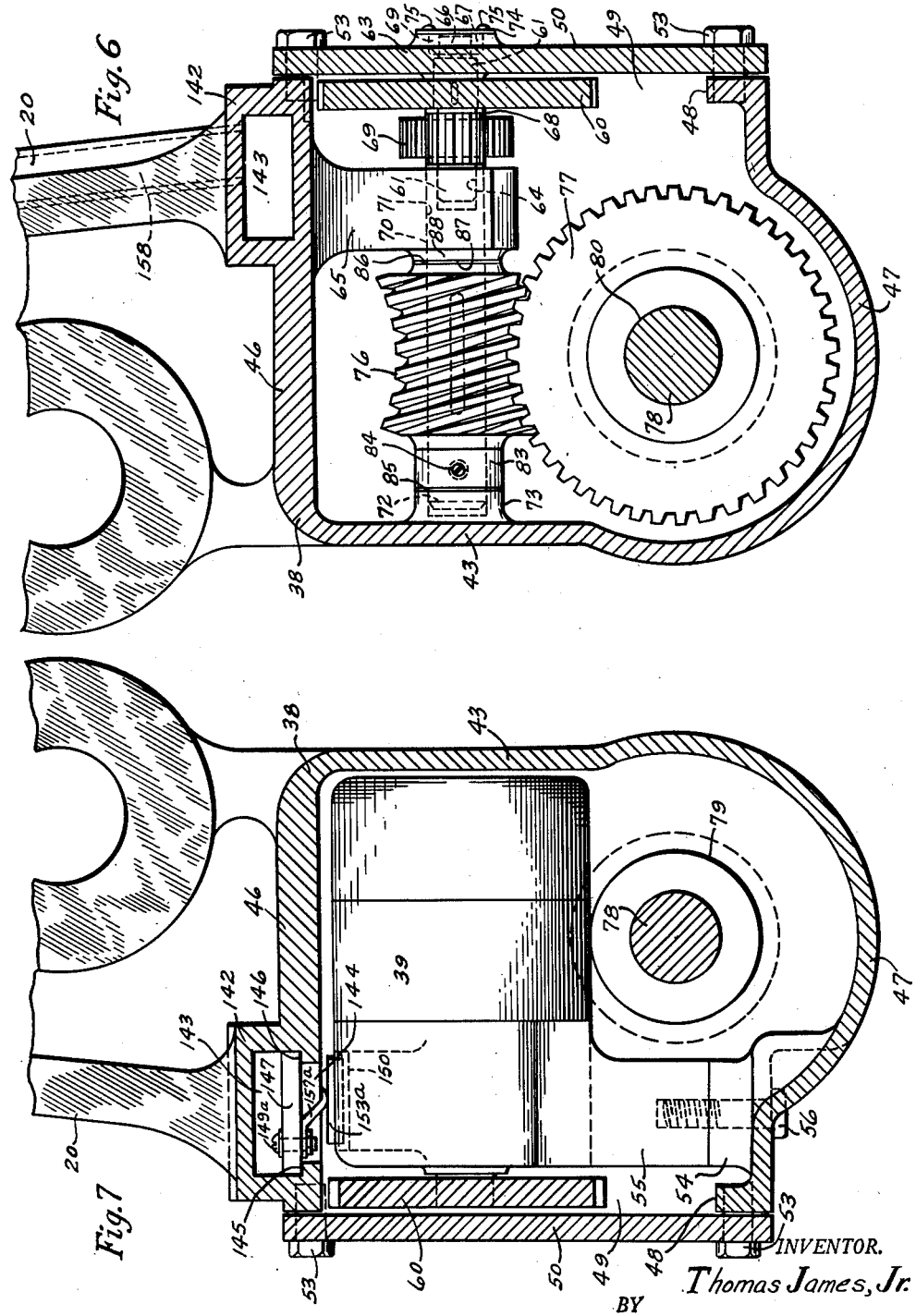

Patented Nov. 4, 1952

2,616,527

UNITED STATES PATENT OFFICE 2,616,527

BRAKE SLACK ADJUSTING MECHANISM

Thomas James, Jr., Oaklyn, N. J., assignor to Specialty Brake Appliance Company, Camden, N. J., a corporation of New Jersey Application February 4, 1947, Serial No. 726,284

12 Claims. (Cl. 188—198)

This invention relates to brake slack adjusting mechanisms, and more particularly to brake slack adjusting mechanisms for the wheel brakes employed on railroad vehicles.

It is an object of the invention to provide unitary slack adjusting means mounted in one of the brake levers of a brake mechanism which is adapted for both power and manual operation.

A more specific object is to provide in an air brake mechanism for railway vehicles, comprising a pair of oppositely disposed brake levers and pull rod means connecting said levers, an automatic, unitary slack adjusting means mounted in one of said levers and operable on said pull rod means to take up slack in the said brake mechanism due to wear on the parts.

A still further object is to provide in brake mechanisms of the class described electrically operable slack adjusting means including a reversible electric motor, automatically operable power-controlling unit such as a switch mechanism for causing operation of said motor when slack occurs in said brake mechanisms to take up such slack, and manually operable switch means for reversing the operation of said motor to cause separation of the parts and thereby enable disassembly and repair of the brake mechanism.

In carrying out the invention in one form thereof, there is provided slack adjusting means for the brake system of a railroad car which includes a power source separate from the power source of the brake system. This power source is mechanically connected to the linkage of the brake system and is arranged for actuation to take up the slack in said linkage by varying the relative positions of the parts thereof when the brake shoe is fully applied to the wheel. A control system for automatically actuating the slack adjusting power source is arranged to be operated by movement of an element of the linkage to and beyond a predetermined position when the brake shoe is applied to the wheel. Further in accordance with the invention, the slack adjusting power source is a reversible electric motor carried by one of the operating levers of the wheel brake mechanism. The motor is connected to a pair of spaced pinions arranged to engage a plurality of spaced pins forming a self-cleaning rack mounted in a pair of spaced, substantially parallel, pull rods.

Other and further objects will become apparent as the description of the invention progresses.

Of the drawings:

Fig. 2 is an end view, partly in section, taken substantially along line 2—2 of Fig. 1.

Fig. 3 is a fragmentary end view, partly in section, taken substantially along line 3—3 of Fig. 1.

Fig. 4 is a side elevational view, partly in section, of the switch mechanism for the slack adjusting means, together with a wiring diagram of the electric circuit, including the electric motor, the source of electric potential, and the associated control and reversing switches.

Fig. 5 is a fragmentary elevational view of a portion of the structure shown in Fig. 3, certain parts being shown removed or broken away to more clearly illustrate the arrangement of the gearing;

Fig. 6 is a view of the slack adjusting mechanism, partly in section, taken substantially along line 6—6 of Fig. 5.

Fig. 7 is a view of the slack adjusting mechanism, partly in section, taken substantially along line 7—7 of Fig. 5; and Fig. 8 is a side elevational view of a brake mechanism and associated brake slack adjusting means of a modified construction.

Figure 1:
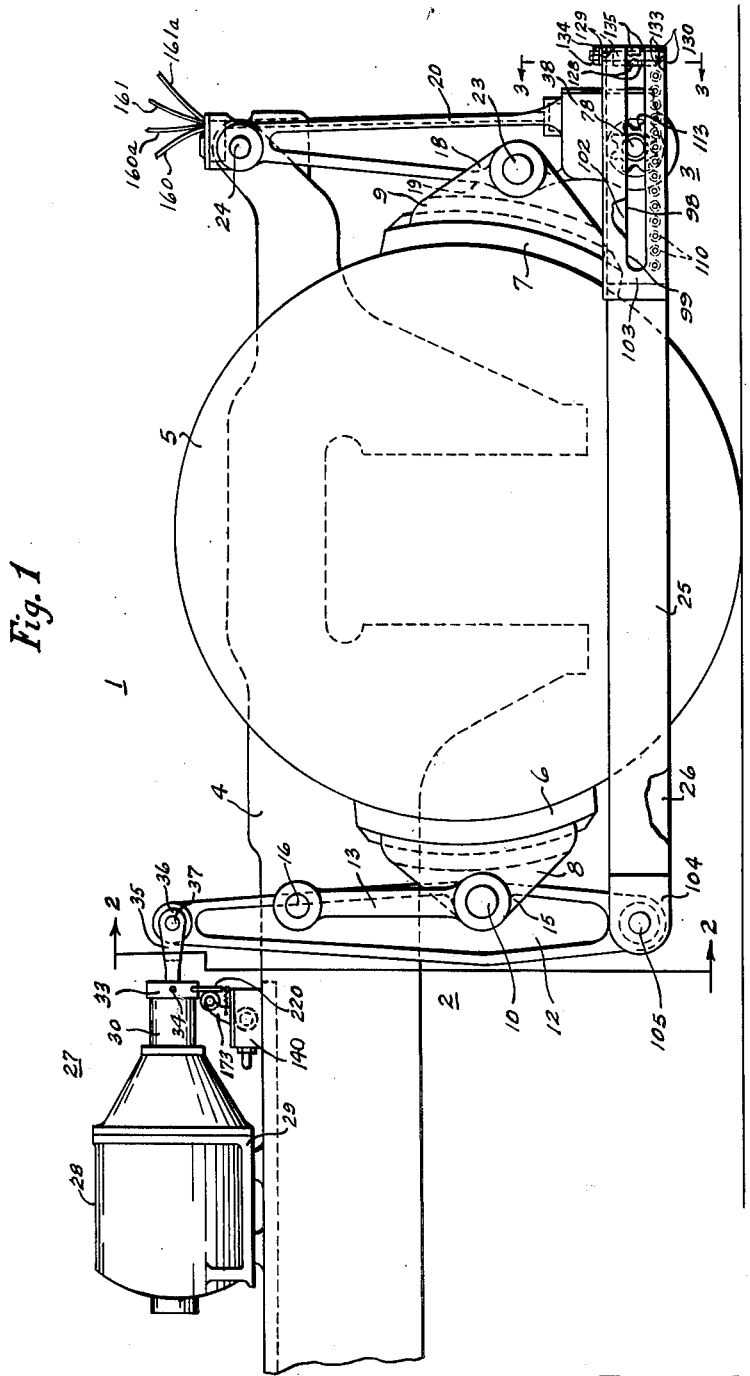
Fig. 1 is a side elevational view of a brake mechanism showing the preferred form of slack adjusting means associated therewith.

Referring to the drawings and more particularly to Figs. 1 to 3 thereof, the numeral 1 indicates generally the combined assembled device consisting of a brake mechanism indicated generally at 2 and the slack adjusting means for said brake mechanism indicated generally at 3.

The brake mechaism 2, manually controllable, comprises a supporting frame 4 which, when the device is employed on railroad vehicles, may be the wheel truck upon which the vehicle body proper is mounted. A wheel 5, with which the brake mechanism 2 is associated, is rotatably supported in the usual manner on frame 4. Brake elements including shoes 6 and 7, mounted in any suitable manner in brake heads 8 and 9 respectively, engage the periphery of wheel 5 at opposite sides thereof. Brake head 8 is supported upon a pin 10 which extends through aligned apertures provided in a substantially vertically disposed brake operating lever 12 intermediate the ends of the latter, the lower ends of a pair of substantially vertical supporting arms 13 and 14, and in the outer reduced portion 15 of the said brake head 8. The reduced portion of brake head 8 is bifurcated, as shown in Figs. 1 and 2, so as to receive a portion of lever 12. The upper ends of arms 13 and 14 are rotatably supported on pins 17 and 16 respectively, which in turn are secured in any suitable manner to the supporting frame 4. Lever 12 and brake shoe 6 thus are effectively supported by arms 13 and 14.

Brake head 9 for brake shoe 7 is also bifurcated, as shown at 18, so as to receive the inner extended portion 19 of a substantially vertical dead lever 20. Brake head 9 is pivotally mounted on a pin 23 extending through aligned apertures provided in lever 20 and the bifurcations 18 of said brake head 9. The upper end of lever 20 is pivotally supported on a pin 24, which in turn is secured in any suitable manner to the frame 4. The lower ends of levers 12 and 20, as will appear more fully hereinafter, are connected by a pair of adjustable means, links 25 and 26, commonly known as pull rods, so that upon movement of lever 12 by operating mechanism 27 attached thereto the brake shoes 6 and 7 are substantially simultaneously moved against or out of engagement with wheel 5.

The operating mechanism 27 may be of any suitable type, and as herein shown is a power source which comprises a reciprocating air motor 28 known as a brake cylinder. The casing 29 of brake cylinder 28 is secured to frame 4 by any suitable means. The piston rod 30 of brake cylinder 28 has an enlarged collar 33 secured to the outer end thereof by means of a locking pin 34. A push rod 35 is connected at one end to the hollow interior of piston rod 30 by any suitable means. The outer bifurcated end 36 of push rod 35 is connected by means of a pin 37 to the upper end of lever 12. Thus upon operation of lever 12 to the right (Fig. 1) by brake cylinder 28 and movement of the mechanical linkages, the brake shoes 6 and 7 will be applied to wheel 5, as shown in Fig. 1; and upon operation of lever 12 to the left, as by selective operation of manually controllable means for power source 27 located in the engine to which the railroad car is connected, brake shoes 6 and 7 are moved out of engagement with said wheel. The brake mechanism thus far described, excepting the parts modified in accordance with the invention as described hereinafter, is generally old in the art and was described more or less in detail so as to enable a better understanding of the brake slack adjusting means which comprises the present invention.

The present invention contemplates mechanism which functions automatically to take up slack in the brake mechanism as soon as it occurs therein. Efficient operation of the brake mechanism, therefore, is assured at all times, and as will appear more fully hereinafter the predetermined travel of the actuating element, the piston of brake cylinder 28, is maintained.

Referring more particularly to Figs. 1, 3, 5, 6 and 7, the lower end of dead lever 20 has provided thereon an enlarged hollow portion or casing 38 for housing another power source, the electric motor 39, and reduction gearing 40 of the brake slack adjusting means 3. Casing 38 comprises a partially convex inner wall 43, relatively flat side walls 44 and 45, a flat top wall 46, a partially convex bottom wall 47, and a flat outer wall 48. The outer wall 48 is provided with a relatively large rectangular opening 49, which is normally closed by a cover plate 50. Cover plate 50 is attached to outer wall 48 in any suitable manner, such as by bolts 53.

As shown more particularly in Figs. 5 and 7, motor 39 has provided near the outer end thereof a depending supporting member 55 which seats upon a support 54, secured to and extending upwardly from the bottom wall 47 of casing 38. Bolts 56 extending through aligned threaded openings provided in support 54 and supporting member 55 rigidly secure the motor 39 in the position shown in Fig. 7. An opening 57 is provided in the convex portion of bottom wall 47 near the outer end thereof so that access may be had to bolts 56.

The armature shaft 58 of motor 39 has secured thereto a pinion 59 which meshes with a relatively large gear 60 keyed to a shaft 61. Shaft 61 is journalled at one end in a bearing 63 provided in cover plate 50 and at the other end in a bearing 64 provided in an intermediate supporting member 65 secured to and depending from top wall 46. As shown more particularly in Figs. 5 and 6, the outer end of shaft 61 has formed thereon a square portion 66 which enables attachment thereto of a wrench so that the gears may be operated manually if it is so desired. An enlarged recess 67 is provided in cover plate 50 around the outer end of shaft 61 to facilitate the attachment of a wrench to said shaft. A small gear 68 is secured to shaft 61 which meshes with a larger gear 69 secured to the outer end of a shaft 70. Shaft 70 extends through supporting member 65 and is journalled intermediate its ends in a bearing 71 provided in said supporting member. The other end of shaft 70 is journalled in a bearing 72 provided in a boss 73 secured to and extending inwardly from wall 43. The square end 66 of shaft 61 is covered by a small cover plate 74 which is secured to main cover plate 50 by screw bolts 75. A worm 76 is secured to shaft 70 intermediate the ends of the latter, which meshes with a worm wheel 77 keyed or otherwise secured to a shaft 78. Shaft 78 extends through and is mounted in any suitable bearings 79 and 80 provided in side walls 44 and 45 of casing 38.

A collar 83, secured to shaft 70 by a set screw 84, extends between the left hand end (Fig. 6) of worm 76 and the inner surface 85 of boss 73. The outer surface 86 of the right hand end (Fig. 6) of worm 76 lies in substantially abutting relation with the outer surface 87 of a boss 88 provided at the lower end of supporting member 65.

As shown more particularly in Fig. 5, worm wheel 77 is held against axial movement to the left by a collar 89 secured to shaft 78 by a set screw 90. The right hand side (Fig. 5) of worm wheel 77 is provided with a hub portion 93, the outer surface 94 of which lies in substantially abutting relation with the inner surface 95 of a boss 96 extending inwardly from side wall 45 of casing 38. Axial movement of worm wheel 77 along shaft 78 to the right accordingly is also prevented.

Shaft 78, it will be observed, extends beyond the outer sides of side walls 44 and 45 of casing 38. One end 97 of shaft 78, in assembly, extends through laterally aligned elongated slots 98 and 99 provided respectively in the laterally spaced members 102 and 103 of pull rod 25. Member 102 is relatively flat and extends the entire length and forms the basic element of pull rod 25. The other end of member 102 is provided with an enlarged apertured portion 104 for receiving a pin 105 which, as will appear more fully hereinafter, forms the operating connection between lever 12 and pull rods 25 and 26. Member 103, on the other hand, extends over only a portion of the length of pull rod 25 and the upper end thereof is bent inwardly, as shown at 106, and overlies the upper edge 107 of member 102. Members 102 and 103 may be secured together in any suitable manner, such as by welding.

Members 102 and 103 of pull rod 25 have provided near the lower edges thereof a series of laterally aligned apertures for receiving respectively the reduced ends 108 and 109 of a series of spaced pins 110. Pins 110 form a self-cleaning rack over a portion of the length of pull rod 25 which meshes with a pinion 113 secured on the end portion 97 of shaft 78.

Pull rod 26 is similar in construction to pull rod 25 and also comprises a flat member 114 extending over the entire length thereof and a relatively short member 115. The upper portion of member 115 is bent inwardly, as shown at 116 in Fig. 3, and overlies the upped edge 117 of member 114. Members 114 and 115 are secured together by welding or by any other suitable means and also have provided therein laterally aligned elongated slots 118 and 119 respectively for receiving the other end 120 of shaft 78. Laterally aligned apertures are provided in members 114 and 115 for receiving the reduced ends 121 and 122 respectively of a series of spaced pins 123. Pins 123, like the pins 110, form a self-cleaning rack which meshes with a pinion 124 secured to the end 120 of shaft 78.

The other end of member 114 is provided with an enlarged apertured portion 125 through which the pin 105 extends. As shown in Fig. 2, pin 105 also extends through an aperture provided at the lower end of lever 12. In order to hold lever 12 in centered position, sleeves 126 and 127 are provided on pin 105 which extend between lever 12 and enlarged portions 104 and 125 respectively of pull rods 25 and 26.

Slots 98, 99 and 118, 119 respectively extend to the extreme right hand ends (Fig. 1) of pull rods 25 and 26. Thus to assemble the parts, the outer ends of slots 98, 99 and 118, 119 are brought into alignment respectively with the outer ends 97 and 120 of shaft 78. Lever 20 is then moved to the left (Fig. 1), causing the pinions 113 and 124 to roll over pins 110 and 123 in meshing relation therewith.

In order to prevent accidental disengagement of pinions 113 and 124 with pins 110 and 123, stop members 128 are provided near the right hand ends (Fig. 1) of pull rods 25 and 26. Stop members 128 may be of any suitable construction, and, as herein shown, each of said members comprises a bolt 129 of T-shaped construction, the rectangular head portion 130 thereof extending into correspondingly shaped recesses 133 provided in the lower edges of members 102, 103 and 114, 115 of pull rods 25 and 26 respectively. The upper threaded ends of bolts 129 extend through apertures provided in the upper portions 106 and 116 of members 103 and 115 and nuts 134 retain the bolts in position. Bolts 129 also have provided thereon protective sleeves 135, as shown in Fig. 1.

From the foregoing description it is seen that upon rotation of motor 39 in one direction pinions 113 and 124 operating on pins 110 and 123 will move levers 12 and 20 toward each other, thereby taking up any slack that may occur in the brake mechanism 2. When motor 39 is reversed, levers 12 and 20 will be moved away from each other, thereby creating sufficient slack to enable replacement of the brake shoes 6 and 7. For removal of wheels 5, the stops 128 and pin 105 are removed and pull rods 25 and 26 may then be disengaged from levers 12 and 20.

The operation of electric motor 39 is controlled by a power-controlling unit such as the switch mechanism shown more particularly in Figs. 1 and 4 and indicated generally by the numeral 140. As shown in Figs. 5, 6 and 7, the upper wall 46 of casing 38 has provided near the outer side thereof a raised portion 142 forming a substantially rectangular chamber 143. A reduced rectangular opening 144 is provided in wall 46 which connects chamber 143 with the interior of casing 38 immediately above electric motor 39. The reduced opening 144 provides a pair of spaced shoulders 145 and 146. A plate 147 constructed of electric insulating material and having spaced electric contact elements 148, 148ª, 149 and 149ª mounted therein seats upon shoulders 145 and 146. Electric motor 39 also has mounted thereon a plate 150 constructed of electric insulating material and having spaced electric conductor bars 152, 152ª, 153 and 153ª mounted therein. Conductor bars 152 and 152ª are connected respectively to the opposite ends of the field coil 154 of motor 39, while bars 153 and 153ª are connected respectively to the opposite sides of the armature 155, as shown more particularly in Fig. 4. As shown in Figs. 5 and 7 electric conductors 156, 156ª, 157 and 157ª connect contact elements 148, 148ª, 149 and 149ª respectively with conductor bars 152, 152ª, 153 and 153ª. Electric motor 39 may be of any suitable type, but for the purpose of illustration it is shown herein, particularly in Fig. 4, as being of the direct current series type.

Conductors 160, 160ª, 161 and 161ª are connected at one end thereof to contact elements 148, 148ª, 149 and 149ª respectively and may be covered with any suitable insulating material. Lever 20 has provided therein a longitudinally extending passage 158 through which conductors 160, 160ª, 161 and 161ª extend. Conductor 161ª connects contact element 149ª with the extension 165 of a contact arm 166 of control switch 140. Contact arm 166 is pivotally mounted on an insulated support 167 secured to and extending inwardly of side wall 168 of the casing 164 of control switch 140 and is provided with an arcuate contact surface 169 which engages the outer periphery of an annular contact element 170. A coil spring 171 connected at one end to an insulated stud 172 provided on arm 166 and at the other end to a stud 172' secured to and extending inwardly from side wall 168 resiliently holds the said arm 166 in contact with annular contact element 170. Contact element 170 is connected to a vertical arm 173 by a disc 174 constructed of insulating material. Arm 173 and annular contact element 170 are rotatably mounted on a stud 175 having a ring 176 of insulating material provided thereon, the said stud being secured in any suitable manner to side wall 168 of casing 140.

Annular contact element 170 has secured thereto a contact member 177 which is adapted to engage the upper end 178 of a contact arm 179, the lower end of the latter being pivoted, as shown at 180, to the upper end of a bracket 182 constructed of material which is a good conductor of electricity. Bracket 182 is secured by bolts 183 to a plate 184 constructed of insulating material which in turn is secured in any suitable manner to the bottom wall 185 of casing 164.

Contact arm 179 has secured thereto and extending laterally thereof a stud 186 having a ring 187 of insulating material thereon which receives the inner apertured end 188 of the inner element 192 of an adjustable link 189. A disc 190 of insulating material also extends between arm 179 and inner element 192. The inner element 192 of link 189 is provided with an internally threaded bore 193 in which extends the correspondingly threaded end 194 of outer element 195 of said link. Outer element 195 extends through the end wall 196 of casing 164 and lock nuts 197 and 198 provided on said element at opposite sides of the wall 196 effectively hold the parts in adjusted position. A protective cap 199 is provided on the outer end of element 195, as shown in Fig. 4. Thus by rotating outer element 195, contact arm 179 may be moved toward or away from contact member 177.

As shown in Fig. 4, a conductor 200 connects bracket 182 with a pole 162 of a reversing switch 163 mounted within the casing 164 of control switch 140. A second pole 202 of switch 163 is connected by a conductor 202' with a third pole 203 of said switch. A fourth pole 204 of switch 163 is connected by a conductor 204' to pole 162. Switch 163 also comprises a switch member 205 constructed of insulating material having a pair of spaced conducting contact elements 206 and 207 mounted therein which, when in the position shown in Fig. 4, engage respectively poles 162 and 202, but when actuated by a push-button, as will presently appear, are adapted to engage poles 203 and 204 respectively. An actuating rod 208 is secured to switch member 205 and extends through an opening provided in wall 210 of the casing 213 of switch 163. Rod 208 has secured to the outer end thereof a head or button 214. A coil spring 215 extends between button 214 and the wall 210 and normally retains the contact elements 206 and 207 in contact with poles 162 and 202. Upon actuation of rod 208 inwardly, contact elements 206 and 207 are brought respectively into engagement with poles 203 and 204, thereby, as will presently appear, effecting a reversal of motor 39. Upon release of button 214, spring 215 restores the parts to the position shown in Fig. 4 wherein contact elements 206 and 207 again engage poles 162 and 202 respectively.

Conductor 161 connects contact element 149 with pole 202 of switch 163. Conductor 160a connects contact element 148a with the contact element 207 of switch 163, while conductor 160 connects contact element 148 with the pole 219a of a line switch 219. Contact element 206 of switch 163 is connected to a second pole 219b of line switch 219 by a conductor 209. Poles 219a and 219b may be connected by switch 219 to any suitable source of electric potential, such as a battery 216, by conductors 217 and 218 respectively.

As shown in Figs. 1 and 4, the collar 33 secured to the piston rod 30 of brake cylinder 28 has secured to and depending therefrom a plate 220 which is adapted to engage the upper antifriction end 222 of contact arm 173. A resilient means, coil spring 223, secured at one end to arm 173 and at the other end to a bracket 224 secured to and extending upwardly from casing 164 urges arm 173 to the right, tending to establish contact between the upper end 178 of arm 179 and contact member 177. Normally, arm 173 is so held by plate 220 that contact is broken between contact member 177 and arm 179. However, when slack occurs due to wear on the parts of the brake mechanism, piston rod 30 and plate 220 are moved to the right (Figs. 1 and 4) a greater than normal distance, causing spring 223 to swing arm 173 a greater than normal distance in a clockwise direction (Figs. 1 and 4), thus bringing contact member 177 into engagement with arm 179 and thereby completing the circuit to electric motor 39, which then operates to take up such slack. Fig. 4 shows the plate 220 attached to the collar 33 of piston rod 30 out of engagement with arm 173 and switch elements 177 and 179 in contact with each other. The circuit to electric motor 39 is accordingly closed.

By virtue of suitable provisions or structure such as the annular contact element 170, contact between it and arm 166 is always maintained regardless of the arc through which arm 173 is swung by operation of brake cylinder 28.

When the slack has been taken up, piston rod 30 will have been moved to the left (Figs. 1 and 4) a sufficient distance to cause plate 220 to actuate arm 173 to break the contact between contact member 177 and arm 179. The circuit to motor 39 is thus broken and it consequently comes to rest.

From the foregoing description, the operation of my improved slack adjusting means is believed to be clear. However, in order to correlate the various elements thereof a brief résumé of the operation of the device as a whole will now be given.

Contact arm 179 is first adjusted by manipulation of outer element 195 of link 189 until it assumes the proper position with respect to contact member 177. The proper position under operating conditions is obtained when contact member 177 and contact arm 179 are just out of contact with each other at the time that brake cylinder 28 has operated piston rod 30 and consequently arm 12 to the right, bringing shoes 6 and 7 into braking contact with wheel 5. As a result of the broken contact between contact member 177 and arm 179, the circuit to motor 39 is interrupted and consequently the motor remains at rest. To release the brakes, piston rod 30 is moved to the left (Fig. 1), causing plate 220 to swing lever 173 against the action of spring 223 in a counter-clockwise direction (Figs. 1 and 4). Such action, however, brings contact member 177 farther away from contact arm 179, since the latter is held rigidly in adjusted position by link 189, and consequently contact between member 177 and arm 179 remains broken. Now, when the brakes are again applied, the piston rod 30 moves to the right carrying plate 220 with it until the predetermined extent of piston travel is reached. At this time the brakes are fully applied. When piston rod 30 and plate 220 have reached the predetermined extent of travel, arm 173 still engages plate 220 and consequently elements 177 and 179 are still out of engagement with each other and the circuit to motor 39 remains broken. The brake mechanism now continues to function in a normal manner until slack occurs therein due to wear on the brake shoes 6 or 7, or other parts of the mechanism. When such slack occurs, the piston and its rod 30 will be permitted by such slack to move to the right beyond the predetermined extent of piston travel aforesaid. When this extra movement takes place, spring 223 swings lever 173 in a clockwise direction, bringing contact member 177 and arm 179 into contact with each other. Inasmuch as contact elements 206 and 207 of reversing switch 163 are in contact with poles 162 and 202 respectively, the circuit to the electric motor 39 is closed. Current now flows from the battery 216, through conductor 217, switch 219, pole 219a, conductor 160, field coil 154, conductor 160a, contact element 207, pole 202, conductor 161, armature 155, conductor 161ª, contact arm 166, contact element 170, contact member 177, contact arm 179, bracket 182, conductor 200, pole 162, contact element 206, conductor 209, pole 219ᵇ, switch 219, and conductor 218 and returns to battery 216.

Upon operation of actuator motor 39, pinions 113 and 123 will actuate the rack members formed by pins 110 and 123 respectively on pull rods 25 and 26, thereby shortening the length of the latter and causing movement of levers 20 and 12 toward each other. When this occurs, lever 12 will be actuated slightly in a counter-clockwise direction about pin 10 (Fig. 1) as a pivot, actuating piston rod 30 and consequently plate 220 to the left, thereby swinging arm 173 in a counter-clockwise direction to bring contact member 177 and arm 179 out of contact with each other. When this occurs, the circuit to the motor is interrupted and the latter comes to rest. It, therefore, is seen that all slack in the brake mechanism 2 is taken up by the shortening of the effective length of pull rods 25 and 26, and the brake mechanism may now again function in a normal manner until slack again occurs therein. Piston rod 30 of brake cylinder 28 now again operates at its normal predetermined extent of travel as aforesaid. It is also seen that the mechanism just described functions to take up slack while the brakes are applied, and accordingly such slack is eliminate as fast as it occurs in the brake mechanism. When slack again occurs in the mechanism the operation just described is repeated and such slack is then again taken up. These operations are repeated until the brake shoes, for example, have been worn to such an extent that replacement thereof appears desirable.

In order to make replacements and other repairs to the apparatus as a whole, the operator presses push-button 214 of switch 163 inwardly against the action of spring 215, bringing contact elements 206 and 207 into contact with poles 203 and 204 respectively. He also adjusts link 189 to make contact between switch elements 177 and 179. Current now flows from battery 216 through conductor 217, switch 219, pole 219ª, conductor 160, field coil 154, conductor 160ª, contact element 207, pole 204, conductor 204', pole 162, conductor 200, bracket 182, arm 179, contact member 177, contact element 170, arm 166, conductor 161ª, armature 155, conductor 161, pole 202, conductor 202', pole 203, contact element 206, conductor 209, pole 219ᵇ, switch 219, and conductor 218 and returns to battery 216. The circuit to motor 39 is, accordingly, reversed whereupon pinions 113 and 124 are actuated in a clockwise direction, causing pull rods 25 and 26 to move levers 12 and 20 away from each other. This movement of levers 12 and 20 and pull rods 25 and 26 produces sufficient slack to permit replacement of brake shoes 6 and 7.

When pull rods 25 and 26 have been lengthened sufficiently, the operator releases push-button 214, whereupon contact elements 206 and 207 are actuated into contact with poles 162 and 202 by spring 215, thus reconditioning the circuit for normal operation. To readjust the brakes after replacement of brake shoes 6 and 7, the brakes are simply applied by operation of brake cylinder 28 and the predetermined travel of the piston and rod 30 thereof is reestablished.

In the event that it should for any reason be desired to manually operate the slack adjusting means, the brakes are first applied by operation of brake cylinder 28. Cover plate 74 is now removed and a wrench fastened to the square end 66 of shaft 61. Upon operation of shaft 61 in this manner pinions 113 and 124 are actuated to shorten pull rods 25 and 26 and thereby take up the slack in the brake mechanism.

Upon operation of shaft 61 in the opposite direction, the length of pull rods 25 and 26 is increased. By removing stops 128 from pull rods 25 and 26, the latter may be entirely separated from lever 20 by continued movement of shaft 61, as just described.

Due to the friction in the reduction gearing 40, it is apparent that the pull rods 25 and 26 will be effectively held in each position of adjustment and that the effective length thereof can be changed only by operation of said gearing either by electric motor 39 or by manual operation of shaft 61.

Fig. 8 illustrates a modification of the present invention wherein a pair of cables 25' and 26' is provided instead of pull rods. As shown therein, the outer ends of shaft 78 have provided thereon sheaves 225 and 226. One end of each of the cables 25' and 26' is anchored, as shown at 227, to the sheaves 225 and 226; while the other end is anchored, as shown at 29, to a pin 105' connected to the lower end of lever 12. The other parts of the apparatus are identical with those shown in Figs. 1 to 7. Accordingly, when slack occurs in the brake mechanism, sheaves 225 and 226 will be operated in a clockwise direction to bring levers 12 and 20 toward each other and thereby take up such slack. The brake mechanism then functions in a normal manner until slack again occurs therein when the operation is repeated.

In the event that it is desired to replace the brake shoes or to make other adjustments, the associated electric motor is reversed, as previously described, causing the sheaves 225 and 226 to rotate in a counter-clockwise direction, thereby producing sufficient slack in cables 25' and 26' to enable the levers 12 and 20 to be moved away from each other. The worn brake shoes may now be replaced with new ones. When it is desired to disassemble the apparatus, the anchoring mechanism 229 may be disengaged. Levers 12 and 20 will then be disconnected and may be manually moved away from wheel 5.

It, therefore, is seen that simplified and highly useful slack adjusting mechanisms have been provided which automatically take up the slack in brake mechanisms as soon as it occurs therein. The slack is taken up while the brakes are applied and therefore it is eliminated as fast as it occurs. Efficient operation of the brake mechanisms is, therefore, assured. By providing automatic means of the character described for taking up slack, constant inspection of the brake mechanism is unnecessary. Brake shoes are so constructed as to provide efficient service for long periods of time, and with automatic means for taking up slack in the system the mechanism as a whole requires but little personal attention.

The slack adjusting mechanism except the switch mechanism 140 is carried entirely by one of the brake levers and therefore constitutes a self-sustained unitary structure. The slack adjusting mechanism may, therefore, be readily installed in existing brake mechanisms as well as in new installations. In existing installations it is only necessary to replace one of the levers and the associated pull rods.

The invention, for the purpose of illustration, has been shown in connection with brake mechanisms of the type having a brake shoe at either side of a wheel. It is apparent, however, that the invention is equally well adapted for use with brake mechanisms having one brake shoe or more than two brake shoes as well.

It is apparent that the invention is also adapted for use in connection with brake mechanisms employing brake drums instead of wheels and wherein various types of brake shoes or bands are utilized in connection therewith. It is obvious that other modifications may be made to the devices herein shown and described without departing from the invention.

Accordingly, while the embodiments of the invention herein shown and described are admirably adapted to fulfill the objects primarily stated, it is to be understood that it is not intended to limit the invention thereto, since it may be embodied in other forms, all coming within the scope of the claims which follow.

What is claimed is:

1. In a device of the class described, the combination of a brake mechanism comprising a plurality of spaced brake elements, brake levers operatively connected to said brake elements, adjustable pull rods operatively connecting said brake levers, reciprocable operating means connected to one of said brake levers for applying and releasing said brakes, slack adjusting means mounted on and housed within one of said levers comprising an electric motor, pinons operable by said motor, and reduction gearing connecting said motor to said pinions, rack means provided on said pull rods meshing with said pinions whereby upon operation of said motor in one direction the effective length of said pull rods is decreased, a control switch for said motor, means operated by said operating means for holding said switch open only during normal travel of said operating means in either direction, and automatically operable means for closing said switch upon movement of said operating means to and beyond its normal extent of travel when applying the brakes to thereby cause operation of said motor to shorten effectively said pull rods to take up the slack in said brake mechanism.

2. In a device of the class described, the combination of a brake mechanism comprising a pair of spaced brakes, a brake lever operatively connected to each of said brakes, adjustable pull rods operatively connecting said brake levers, reciprocable operating means connected to one of said brake levers for applying and releasing said brakes, slack adjusting means mounted on one of said levers comprising an electric motor, pinions operable by said motor and reduction gearing connecting said motor to said pinions, rack means provided on said pull rods meshing with said pinions whereby upon operation of said motor in one direction the effective length of said pull rods is decreased and upon operation of said motor in the opposite direction the length of said pull rods is increased, a normally open control switch for said motor, means operated by said operating means for holding said switch open during normal travel of said operating means in either direction, automatically operable means for closing said switch upon movement of said operating means beyond its normal extent of travel when applying the brakes to thereby cause operation of said motor to actuate said pull rods to take up the slack in said brake mechanism, and a manually operable reversing switch for reversing the operation of said motor.

3. In a device of the class described, the combination of a brake mechanism comprising a pair of spaced brakes, a brake lever operatively connected to each of said brakes, adjustable pull rods operatively connecting said brake levers, reciprocable operating mechanism operatively connected to one of said brake levers for applying and releasing said brakes, slack adjusting means mounted on one of said levers comprising an electric motor, pinions operable by said motor through reduction gearing, racks on said pull rods meshing with said pinions, whereby upon operation of said motor in one direction the effective length of said pull rods is decreased and upon operation of said motor in the opposite direction the length of said pull rods is increased, a control switch for said motor, means operated by said operating mechanism for holding said control switch open only during normal travel of said operating mechanism in applying and releasing said brakes, resilient means for closing said switch upon movement of said operating mechanism beyond its normal extent of travel when applying said brakes to thereby cause operation of said motor to shorten said pull rods to take up the slack in said brake mechanism, said shortened pull rods so actuating said brake levers as to limit the movement of said operating mechanism to its normal extent of movement.

4. In a device of the class described, the combination of a friction brake mechanism, operating means including an actuating element for said brake mechanism, and automatically operable means associated with said brake mechanism for taking up slack due to wear on the parts thereof, said last mentioned means including an electric motor for adjusting said mechanism to take up said slack due to said wear, an electric circuit connected to said motor, a control switch in said circuit, means associated with said operating means for retaining said control switch open during normal operations of said actuating element between brake-applying and brake-releasing position thereby interrupting the circuit to said motor, and means operable by movement of said element beyond a predetermined brake-applying position for closing said control switch when slack occurs in said brake mechanism to energize said motor for operation to take up said slack and to return said element to its predetermined brake-applying position, said control switch thereupon opening to deenergize said motor.

5. In a device of the class described, the combination of a friction brake mechanism, operating means for said brake mechanism, and automatically operable means associated with said brake mechanism for taking up slack due to wear on the parts thereof, said last mentioned means including a reversible electric motor, means forming a driving connection between said motor and the slack take-up means for operation of said take-up means by said motor, an electric circuit connected to said motor, a control switch in said circuit, means associated with said operating means for retaining said control switch open during normal operation of said operating means thereby interrupting the circuit to said motor, means for closing said control switch when slack occurs in said brake mechanism thereby closing the said circuit to said motor and causing operation of said motor to take up said slack, and manually operable reversing switch means in said circuit for reversing the operation of said electric motor.

6. In a device of the class described, the combination of a wheel brake mechanism comprising a pair of brake shoes, one of said brake shoes being disposed at each side of said wheel, a lever operatively connected to each of said brake shoes, adjustable means connecting said levers for simultaneous movement, operating means for actuating said levers to move said brake shoes into and out of engagement with said wheel, means carried by one of said levers for actuating said adjustable means to take up all excess slack in said brake mechanism as soon as it occurs therein, said last mentioned means including a reversible electric motor, means forming a driving connection between said motor and said adjustable means for varying the effective length of said adjustable means upon operation of said motor, an electric circuit connected to said motor, a control switch in said circuit, means associated with said operating means for normally retaining said control switch open thereby interrupting the said circuit to said motor, means for closing said control switch when slack occurs in said brake mechanism thereby closing said circuit to said motor causing the latter to actuate said adjustable means to take up said slack, and manually operable reversing switch means in said circuit for reversing the operation of said motor to cause the latter to actuate said adjustable means and said levers to move said brake shoes away from said wheel.

7. In a device of the class described, the combination of a wheel brake mechanism comprising a pair of brake shoes, one of said brake shoes being disposed at each side of said wheel, a lever operatively connected to each of said brake shoes, a pair of spaced adjustable members connecting said levers for substantially simultaneous movement, rack means on said adjustable members, operating means for actuating said levers for moving said brake shoes into and out of engagement with said wheel, and means carried by one of said levers for actuating said adjustable members to take up all excess slack in said brake mechanism due to wear on the parts thereof during application of said brakes, said last mentioned means comprising a shaft, a pair of spaced pinions secured to said shaft meshing with the said rack means on said adjustable members, an electric motor, and reduction gearing operatively connecting said electric motor and said shaft.

8. In a device of the class described, the combination of a wheel brake mechanism comprising a pair of brake shoes, one of said brake shoes being disposed at each side of said wheel, a lever operatively connected to each of said brake shoes, a pair of spaced adjustable members connecting said levers for substantially simultaneous movement, rack means on said adjustable members, operating means for actuating said levers for moving said brake shoes into and out of engagement with said wheel, and means carried by one of said levers for actuating said adjustable members to take up all excess slack in said brake mechanism due to wear on the parts thereof, said last mentioned means comprising a shaft, a pair of spaced pinions secured to said shaft meshing with the said rack means on said adjustable members, a reversible electric motor, reduction gearing operatively connecting said electric motor and said shaft, an electric circuit connected to said motor, a control switch in said circuit, means associated with said operating means for retaining said control switch open during normal operations of said operating means thereby interrupting the circuit to said motor, means for closing said control switch when slack occurs in said brake mechanism thereby closing said circuit to said motor causing the latter to actuate said adjustable members to take up said slack, and manually operable reversing switch means in said circuit for reversing the operation of said motor to cause the latter to actuate said adjustable members and said levers to move said brake shoes away from said wheel.

9. In a device of the class described, the combination of a wheel brake mechanism consisting of a pair of brake shoes, one brake shoe being provided at each side of the wheel, a brake lever for each of said brake shoes, one or more adjustable pull rods connecting said levers for substantially simultaneous movement thereof and operating means for actuating said levers to move said brake shoes toward and away from said wheel, each of said pull rods comprising a pair of spaced, substantially parallel members having laterally aligned, longitudinally extending slots therein, a series of spaced pins mounted in said parallel members forming a self-cleaning rack, a shaft rotatably mounted in one of said levers, the ends of said shaft extending through and being guided in said longitudinally extending slots, pinions secured to said shaft respectively meshing with each of said racks, an electric motor, reduction gearing connecting said motor and said shaft, and automatically operable switch means for energizing said motor when excess slack occurs in said brake mechanism to operate said pull rods to take up all such slack.

10. In a railroad car brake system having a brake shoe, a power source, and a mechanical linkage interconnecting said shoe and said source, said power source being manually controllable to move said linkage selectively to apply and release said brake shoe with respect to a wheel of said car, the combination therewith of means including a second power source mechanically connected to said linkage and arranged and adapted when actuated to take up slack in said linkage by varying the relative positions of parts thereof and said shoe when said shoe is fully applied to said wheel, and a control system for automatically actuating said second power source upon movement of an element of said linkage to and beyond a predetermined position in applying said brake shoe to said wheel, said control system including a power-controlling unit having structure operable when said element is beyond said predetermined position to maintain said actuation, but only until said second power source has taken up said slack to an extent sufficient to return said element to said predetermined position whereby a given movement of said element by said first mentioned power source will result in the same braking force regardless of the condition of wear of said shoe.

11. In a railroad car brake system having a brake shoe, a power source, and a mechanical linkage interconnecting said shoe and said source, said power source being manually controllable to move said linkage selectively to apply and release said brake shoe with respect to a wheel of said car, the combination therewith of means including an electric motor mechanically connected to said linkage and arranged and adapted when actuated to take up slack in said linkage by varying the relative positions of parts thereof and said shoe when said shoe is fully applied to said wheel, and a switch mechanism operable by movement of an element of said linkage to and beyond a predetermined position in applying said brake shoe to said wheel for actuating said electric motor, said switch mechanism including provisions to maintain said actuation only until said electric motor has taken up said slack to an extent sufficient to return said element to said predetermined position whereby a given movement of said element by said power source will result in the same braking force regardless of the condition of wear of said shoe.

12. In a device of the class described, the combination of a wheel brake mechanism comprising a plurality of brake shoes, brake levers for said brake shoes, an adjustable pull rod connecting said levers for substantially simultaneous movement thereof, operating means for actuating said levers to move said brake shoes toward and away from said wheel, certain of said pull rods comprising a pair of spaced, substantially parallel members having laterally aligned, longitudinally extending slots therein, a plurality of spaced pins mounted in said parallel members forming a self-cleaning rack, a shaft rotatably mounted in one of said levers, the ends of said shaft extending through and being guided in said longitudinally extending slots, a pinion secured to said shaft meshing with one of said racks, an actuator for said pinion, reduction gearing connecting said actuator and said shaft, and control means for said actuator operable when slack occurs in said brake mechanism to adjust said pull rods to take up such slack.

THOMAS JAMES, Jr.

REFERENCES CITED

The following references are of record in the file of this patent:

UNITED STATES PATENTS

| Number | Name | Date |
|---|---|---|
| 330,251 | McLeod | Nov. 10, 1885 |
| 488,314 | Hinckley | Dec. 20, 1892 |
| 767,364 | Rathbun et al. | Aug. 9, 1904 |
| 773,362 | Anderson | Oct. 25, 1904 |
| 834,107 | Case | Oct. 23, 1906 |
| 874,219 | Mahoney | Dec. 17, 1907 |
| 1,609,459 | Burnham | Dec. 7, 1926 |
| 1,681,058 | Sauvage | Aug. 14, 1928 |
| 1,937,683 | Boirault | Dec. 5, 1933 |
| 1,947,675 | Schwentler | Feb. 20, 1934 |
| 2,127,920 | James | Aug. 23, 1938 |
| 2,236,259 | Cameron | Mar. 25, 1941 |
| 2,236,263 | Farmer | Mar. 25, 1941 |
| 2,397,965 | Hunz | Apr. 9, 1946 |

FOREIGN PATENTS

| Number | Country | Date |
|---|---|---|
| 25,129 | Great Britain | Dec. 22, 1904 |